(12) United States Patent
Feller

(10) Patent No.: US 6,370,963 B1
(45) Date of Patent: Apr. 16, 2002

(54) ULTRASONIC TRANSIT TIME FLOW SENSOR AND METHOD

(76) Inventor: Murray F. Feller, 21577 NW. 75th Avenue Rd., Micanopy, FL (US) 32667

( * ) Notice: Subject to any disclaimer, the term of this patent is extended or adjusted under 35 U.S.C. 154(b) by 0 days.

(21) Appl. No.: 09/592,313

(22) Filed: Jun. 13, 2000

(51) Int. Cl.$^7$ .................................................. G01F 1/66
(52) U.S. Cl. .................................. 73/861.29; 73/861.27
(58) Field of Search ........................ 73/861.29, 861.27, 73/861.31, 861.28, 861.18, 861.25

(56) References Cited

U.S. PATENT DOCUMENTS 4,221,128 A   9/1980   Lawson et al.

*Primary Examiner*—Benjamin R. Fuller
*Assistant Examiner*—Carey D. Mack
(74) *Attorney, Agent, or Firm*—David Kiewit

(57) ABSTRACT

A transit time ultrasonic fluid flow sensor is configured to compensate for circuit related drifts in the flow rate output signal. During acoustic transmission some of the transmitting signal is also routed through the receiving circuits from which a reference signal is derived to provide the compensating signal. In an alternate configuration, compensation or flow sensor drift is derived from reception of the round-trip signals between a pair of transducers.

8 Claims, 2 Drawing Sheets

ULTRASONIC TRANSIT TIME FLOW SENSOR AND METHOD

BACKGROUND OF THE INVENTION

1. Technical Field

This invention relates to a method for measuring the flow rate of a fluid whereby the propagation times of ultrasonic signals transmitted through the fluid can be detected to determine flow rate. The invention further relates to improving the precision of measurement and in particular, flow sensor stability, and reducing power consumption, complexity and cost.

2. Discussion

Ultrasonic transit time flow sensors, also known as "time-of-flight" ultrasonic flow sensors, detect the acoustic propagation time difference between the upstream and downstream ultrasonic transmissions resulting from the movement of the flowing fluid and process this information to derive a fluid flow rate. One method used by these sensors and described in the U.S. Pat. No. 4,221,128 to Lawson et al, is to transmit a burst of continuous waves concurrently on the upstream and downstream transducers. The difference in time between the reception of those signals is a measure of flow rate. Lawson et al use a frequency translation means to convert the received frequencies down to a relatively low frequency for detecting the time difference, which requires some elaboration in electronic circuitry. Furthermore, Lawson et al do not incorporate any error detecting means to compensate for the drift of components as might occur over a period of time or temperature range, and rely instead on costly high stability components.

It is therefore an object of the present invention to incorporate an error detecting means to compensate for component errors, as well as acoustic path related errors, thereby enabling lower cost components and simpler circuits to be used.

SUMMARY OF THE INVENTION

The present invention satisfies the above and other objects by providing an ultrasonic, transit-time flow sensor in accordance with preferred embodiments of the present invention. The sensor, in a first instance, generally operates to detect a signal corresponding to the phase difference between signals from two transducers during the interval of an acoustic transmission, and using this signal to adjust the output flow rate signal to compensate for circuit error inherent in the flow sensor.

In one of the preferred embodiments of the flow sensor, a burst of an acoustic signal is transmitted from a first transducer located upstream of a second transducer. After a period of time greater than that of the acoustic burst signal duration, the signal is received by the second transducer located downstream of the first transducer. Concurrently with the transmission of the first transducer, the second transducer similarly transmits a burst of acoustic energy which is received by the first transducer. Although the transmitted signals are of the same frequency, they are 90 degrees out of phase.

Each transducer has its own receiver. During the transmitted bursts of acoustic energy, the corresponding electrical signals are also routed from the transducers to the two receivers and also an Exclusive-Or phase detector. The output from the phase detector is filtered, sampled and stored to become a signal representative only of the phase shift of the electrical circuits of the flow sensor.

At the time when the transmitted acoustic signals are expected to be received by the transducers, the transducer signals are again routed into the receivers. The Exclusive-Or phase detector detects the difference in phase between the signals resulting from the difference in propagation transit time of the flowing fluid, in addition to the phase shift due to the electrical circuits of the flow sensor. The phase detector also provides a DC signal which is similarly filtered, sampled and separately stored. With amplification, this signal becomes the basic output flow rate signal.

The phase detected signal acquired during the transmission phase is a common mode signal. This signal is combined with the detected signal acquired during reception in a differential amplifier, whereby errors such as phase drifts due to the electrical circuits are canceled.

Both transducer transmissions occur at the same time and the received signals are phase compared against each other. Since the received signals are also received at the same time at zero flow rate, the flow sensing errors due to variances in the propagation of the acoustic energy are minimal. However, in another embodiment of the present invention, transmissions and receptions can occur alternately if desired, whereby each reception can, for example, be phase compared against a common reference signal. In a further embodiment, both transducers and phase detector are responsive to the transducer signals produced by the acoustic transmissions which are reflected back to the originating transducer to produce a common mode correction signal also responsive to acoustic path variations.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
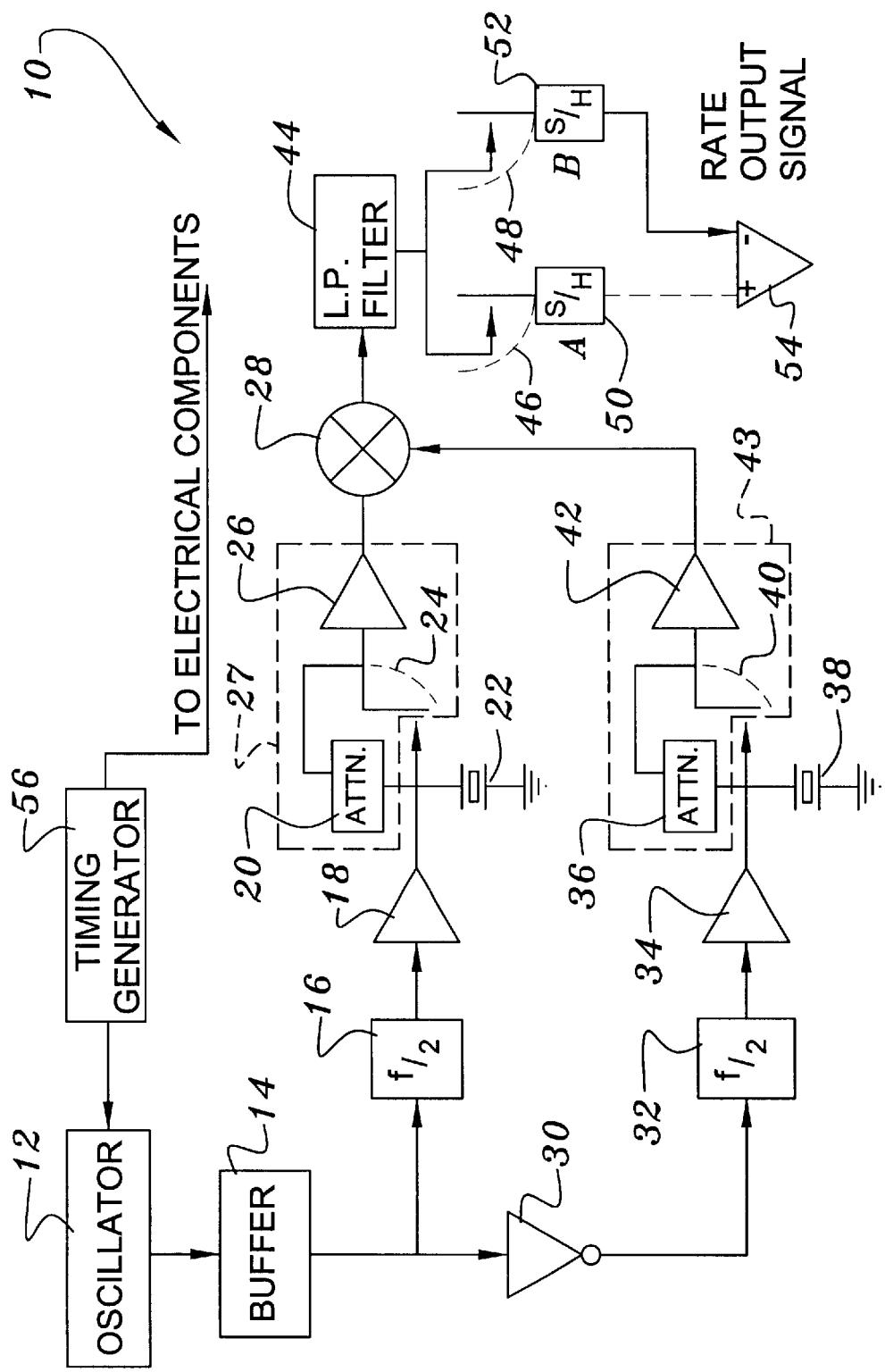
FIG. 1 illustrates a simplified block diagram of a preferred embodiment of the invention.

Referring to FIG. 1, there is shown a flow sensor 10 in accordance with a preferred embodiment of the present invention. An oscillator 12 produces bursts of continuous high frequency waves which are isolated by a buffer 14, and enter a first frequency divider 16 and an inverter 30. The output signal from frequency divider 16 enters amplifier 18 which powers a first transducer 22 and a first attenuator 20. Attenuator 20 can be switched in or out of operation by a first switch 24. The direct (i.e. unattenuated) or attenuated signal from transducer 22 is amplified by an amplifier 26 and enters a phase detector 28. Components 20, 24 and 26 form a first receiving circuit 27. The output signal from inverter 30 is similarly frequency divided by a second divider 32 and amplified by a second amplifier 34 which powers a second transducer 38. The output of the second transducer 38 is coupled to an input of a second amplifier 42 via a switch 40. An attenuator 36 can be switched in our out of operation by the second switch 40. The direct (i.e., unattenuated) or attenuated signal from transducer 38 is amplified in a second amplifier 42 before entering phase detector 28. Components 36, 40 and 42 form a second receiving circuit 43.

The output signal from phase detector 28 is filtered by a low pass filter 44 and is switched by switches 46 and 48 to either one of a pair of sample-and-hold circuits 50 or 52, respectively. The outputs of the sample-and-hold circuits 50 and 52 enter a differential amplifier 54 which provides a rate output signal. Timing generator 56 provides suitable control signals to enable the flow sensor 10 components to operate at the proper times.

During a cycle of operation, oscillator 12 is enabled to provide an electrical signal burst having a duration which is less than the ultrasonic propagation time between transducers 22 and 38. The signal burst, which occurs periodically and typically in the range of a few times per second to several hundred times per second, is isolated by buffer 14 and enters frequency divider 16. The frequency divider reduces the signal frequency by a factor of 2 before it enters amplifier 18, which in turn powers transducer 22. The electrical signal burst from buffer 14 also enters inverter 30 which phase inverts it 180 degrees prior to entering frequency divider 32. From there it proceeds to amplifier 34 for powering transducer 38. During the electrical signal burst, both transducers 22 and 38 are then transmitting acoustic energy signals of the same frequency which is ½ that of the oscillator 12 frequency, but which are phase shifted by 90 degrees. At the same time, switches 24 and 40 are open so that attenuators 20 and 36, respectively, reduce the magnitude of the signals entering amplifiers 26 and 42 to levels approximating those encountered when transducers 22 and 38 are receiving acoustic energy signals from one another.

The output signals from amplifiers 26 and 42 are phase compared in phase detector 28, which is typically an Exclusive-OR type detector. The output from phase detector 28 then enters low pass filter 44 to remove the high frequency burst carrier components therefrom while retaining a DC pulse with a magnitude corresponding to the phase shift between the two burst signals received by the phase detector 28. Switch 48 is enabled to connect the output signal from low pass filter 44 to sample-and-hold circuit 52 to retain the signal representative of the phase relationship (i.e., phase difference) of the two signals present at the phase detector 28 inputs, which then enters the negative input of the output amplifier 54.

At the expected time of reception of the acoustic energy signals which have experienced a differential transit time due to the flowing fluid by transducers 22 and 38, switches 24 and 40 are enabled closed. This disables attenuators 20 and 36 so that the unattenuated received signals enter amplifiers 26 and 42 and then phase detector 28. The output from phase detector 28 enters low pass filter 44, as before, but is routed by switch 46, which is now enabled, to sample-and-hold circuit 50. Circuit 50 retains this signal, which is representative of the phase relationship (i.e., phase difference) of the two signals present at the phase detector 28 inputs, which then enters the positive input of amplifier 54.

During transmission of the acoustic energy signals from each transducer 22 and 38, a portion of the electrical burst signal is simultaneously routed through the receiving circuits 27 and 43, phase detector 28, low pass filter 44, switch 48 and sample-and-hold circuit 52, to establish a reference voltage at the negative input of amplifier 54 for any differential phase shift caused by the components in the two signal paths associated with transducers 22 and 38. Put differently, this differential phase shift represents the difference between the transit time delays caused by the two signal paths that the electrical burst signals travel through in the flow sensor 10. This voltage thus forms a common mode voltage to both input signals to amplifier 54 which cancel each other. In this manner the phase shift that the flow sensor 10 is responsive to is only that produced by the transit time difference between the upstream and downstream acoustic signal propagations.

Phase detection for flow rate determination only occurs between the received acoustic energy signals. Frequency drifts associated with oscillator 12 are experienced equally by both transducers. Accordingly, they cancel one another and the effects of variations of the acoustic path, which may occur, for example, if both transducers 22 and 38 do not transmit and receive at the same time, are minimized.

It should be noted that in both the transmitting and the receiving modes of operation, the same signal path through the same circuits 27 and 43 is used with the minor exceptions of the attenuators 20 and 36, and switches 24 and 40. The corresponding resistive attenuators and electronic switches are, however, considered to be very stable and do not introduce significant phase shift error. Other means such as logarithmic and gain controlled type amplifiers for amplifiers 26 and 42, which will accept both the transmitted and received signals without distorting their phase relationship will allow attenuators 20 and 36, and switches 24 and 40, to be omitted.

At a fluid rate of zero, both transducers 22 and 38 transmit acoustic signals together and, at a later time, receive acoustic signals together. Since their transmitted signals are 90 degrees out of phase, their received signals, having that same phase relationship, will also be 90 degrees out of phase. When the fluid flow rate is other than zero, the upstream and downstream transit times of the acoustic energy will be different and will change the phase difference between the signals into phase detector 28 accordingly. Such a phase relationship is ideal for a simple phase detector such as an Exclusive-Or type detector and allows relatively simple low cost circuits to be used.

When the input signals to the Exclusive-Or phase detector 28 are 90 degrees out of phase, its output, after passing through filter 44 to remove carrier frequency components, is a DC level midway between its maximum and minimum. The phase detector 28 output is a maximum corresponding to its input signals being in phase and a minimum when they are 180 degrees out of phase. The transmission frequency of the acoustic energy is selected so that at the maximum fluid flow rate to be measured, the phase shift between the input signals to phase detector 28 does not vary by more than plus or minus 90 degrees . The polarity of the output signal from phase detector 28 may be reversed, if desired, depending upon the initial phase relationship of the signals. The DC level at midway therefore corresponds to a fluid flow rate of zero which will vary positive or negative depending upon the direction of the fluid flow, and be offset from that midway point in proportion to the rate of the fluid flow. If the flow sensor were to sense fluid flow rate in only one direction, the 90 degree phase shift between the transmitted signals could be reduced to increase the span range of flow rate measurement of phase detector 28, in the desired direction. However, with other types of phase detection and digital computer processing, such phase shift may not be required at all and oscillator 12 may operate at the transmitted frequency. This would eliminate the frequency dividers 16 and 32 and inverter 30 circuits.

It is also possible to transmit a signal burst only from transducer 22 and receive it only by transducer 38, and then transmit only from transducer 38 and receive only with transducer 22, and likewise continue to alternate the receiving and transmitting functions. In this instance, phase detection for both the transmitted and received signals is performed with reference to a stable oscillator 12 signal, for example. In any case, a fundamental aspect of the present invention is the measurement, during a transmission mode of operation, of the phase response of substantially all the electronic circuits of the flow sensor 10 and compensating the flow rate output signal accordingly. This aspect of the present invention provides these features and advantages even if it is used only in an occasional calibration mode of operation and can thus be broadly applied to ultrasonic transit time flow sensors.

Both receivers 27 and 43, phase detector 28, low pass filter 44, switch 48 and sample-and-hold 52 circuit can also be made to respond to the transducer signals produced by the acoustic transmissions which are reflected from the receiving transducer back to the originating transducer. In this way, a common mode correction signal can be generated which also includes the difference in transit time between the round trip propagation times of each of the transducers 22 and 38, it being noted that the roundtrip propagation times do not vary with fluid flow rate since the upstream phase shift is cancelled by the downstream phase shift. However, while this mode of operation takes into account, for example, acoustic path and transducer coupling changes, the received round trip signals are of relatively low magnitude. With some transducer designs and flow sensor applications, the magnitude of the received roundtrip signals may be so low that they may not be usable.

Figure 2A:
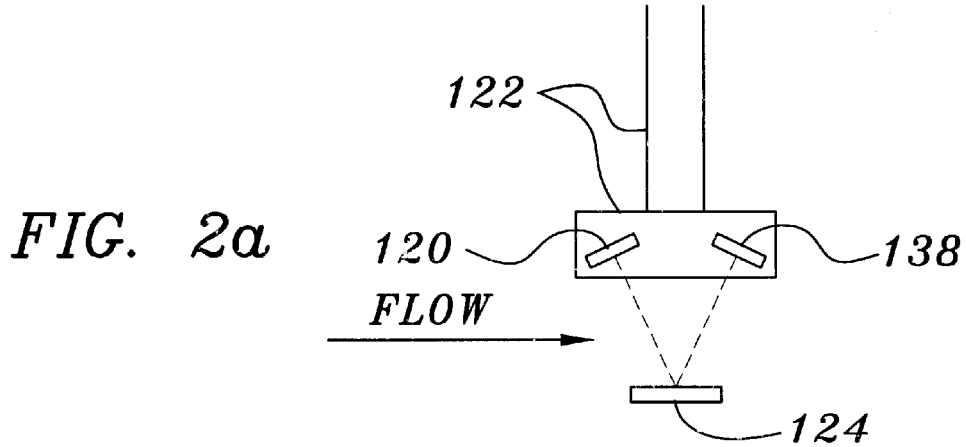
FIGS. 2a–2d illustrate more specifically various preferred implementation of the present invention.
Figure 2B:
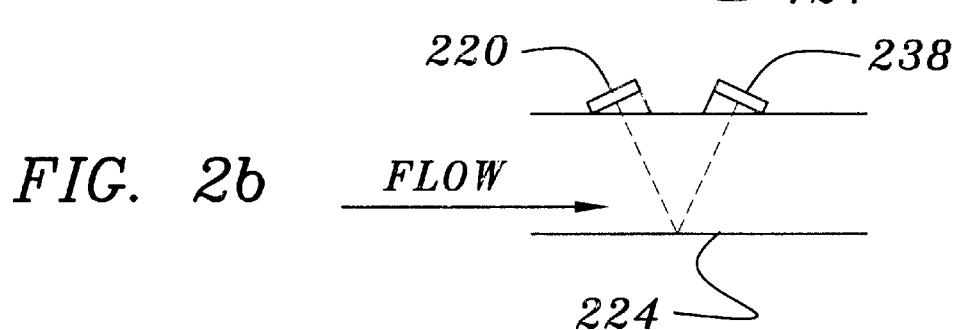
Figure 2C:
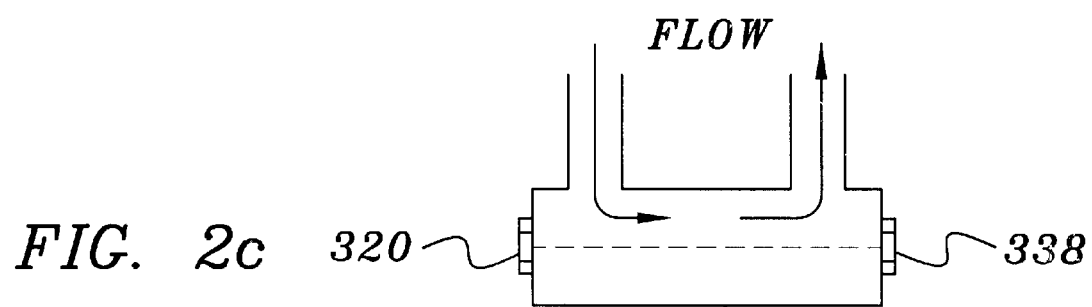
Figure 2D:
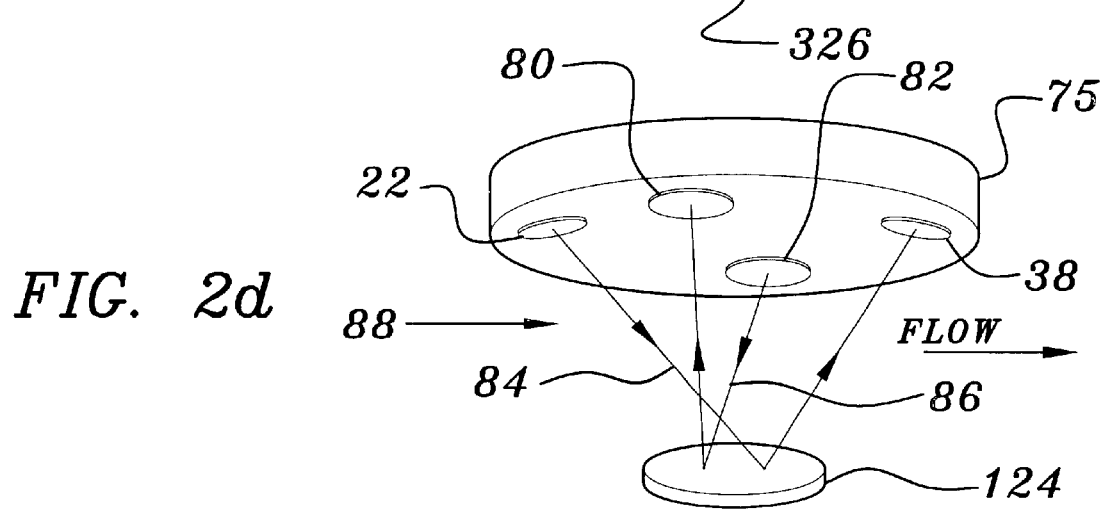

Some of the applicable mechanical configurations of the present invention are illustrated in FIGS. 2a–2c. FIG. 2a shows a probe type sensor in which both transducers 120 and 128 are located. A reflector 124 completes the acoustic path, shown by a dotted line, through the fluid flow between transducers 120 and 128. In FIG. 2b, the transducers 220 and 238 are mounted on the outside of a pipe 224 containing a fluid flow. The internal wall of the pipe 224 acts as a reflector to complete the acoustic path, show by a dotted line, through the fluid between the transducers 220 and 238. In FIG. 2c, transducers 320 and 338 are mounted across a tube 326 facing each other whereby the flowing fluid enters and leaves the tube 326 through openings in the tube 326. The acoustic path, shown by a dotted line, through the flowing fluid is directly between the transducers 320 and 338.

The flow sensor 10 of the present invention may be designed to have very short duty cycles of operation and since relatively few components are required for its operation, it can operate from a very low power electrical power source. It is therefore particularly attractive for use with loop and battery powered applications.

A second set of transducers mounted orthogonally to the first pair 22 and 38 could also be used to derive 2-axes flow rate signals from which a resultant flow rate and direction can be derived. Such a device could beneficially use a single pair of transmitters and receivers and time share them among the corresponding pairs of transducers. Such an embodiment could be used to measure ocean currents, or to sense orthogonal flow components for flow sensor alignment in a pipe, or for a variety of other flow sensing applications.

When the present invention is installed in environments which encourage the accumulation of surface coatings, debris or biogrowths, electrolytic means may be used to clean or maintain clean the acoustically active surfaces. Such an environment could consist of a sea water environment, for example, where a positive potential is applied to the flow sensing or nearby surfaces which have been platinum plated so as to cause a corresponding electric current to flow through the water and generate chlorine gas at those active surfaces. Nearby insulated electrodes or conductive surfaces with a corresponding negative potential complete the current path. Low currents of several milliamperes and less have been found to be effective in maintaining the surfaces of small sensors having only a few square inches in surface area clean in such environments.

Those skilled in the art can now appreciate from the foregoing description that the broad teachings of the present invention can be implemented in a variety of forms. Therefore while this invention has been described in connection with particular examples thereof, the true scope or the invention should not be so limited since other modifications will become apparent to the skilled practitioner upon a study of the drawing, specifications and claims.

What is claimed is:

1. An apparatus for measuring the flow rate of a flowing fluid comprising:

a transmitter for transmitting bursts of electrical signals each having a first duration;

a first transducer responsive to said bursts of electrical signals and located in acoustic contact with said flowing fluid, for transmitting a first acoustic energy signal along an axis parallel to a direction of flow of said flowing fluid, and for receiving at least a component of a second acoustic energy signal responsive to said flow rate of said flowing fluid;

a second transducer responsive to said bursts of electrical signals and located at a distance from said first transducer and in acoustic contact with said flowing fluid, for transmitting said second acoustic energy signal and for receiving at least a component of said first acoustic energy signal responsive to said flow rate of said flowing fluid;

a transit time of said received acoustic energy signals having a second duration, and said second duration being greater than said first duration of said bursts of electrical signals;

a detector responsive to said received components of said first and second acoustic energy signals, as well as to said transmitted bursts of said electrical signals, for determining:

a phase difference in said bursts of said electrical signals caused only by a transit time delay of said bursts of said electrical signals as said bursts of said electrical signals travel through components of said apparatus, and a phase difference between said received acoustic energy signals representing said transit time delays caused by said components in addition to transit time delays caused by said flowing fluid; and generating output signals in accordance with said phase difference signals;

and a flow rate system responsive to said output signals from said detector for generating a flow rate output signal representative of only said flow rate of said flowing fluid.

2. The apparatus of claim 1, further comprising a third and a fourth transducer which are mounted as a pair orthogonally to said first and second transducers, and a switching system to time share said transmitting and said receiving electrical signals to provide a flow rate of said flowing fluid, and a processing system to extrapolate therefrom, a resultant flow rate and direction of said flowing fluid.

3. The apparatus of claim 1, wherein an electrical current is provided through said fluid to cause electrolytic action at a surface of said apparatus in contact with said fluid.

4. An apparatus for measuring the flow rate of a flowing fluid, the apparatus comprising:

a transmitter for transmitting bursts of electrical signals, each burst having a first duration;

a first transducer responsive to said bursts of electrical signals, said first transducer located in acoustic contact with said flowing fluid for transmitting first acoustic energy signals in response thereto along a direction of flow of said flowing fluid, and for receiving at least a component of second acoustic energy signals responsive to said flow rate of said flowing fluid;

a phase shifter for shifting said bursts of electrical signals approximately 90 degrees in phase to produce shifted bursts of electrical signals;

a second transducer responsive to said shifted bursts of electrical signals and located at a distance from said first transducer and in acoustic contact with said flowing fluid for transmitting said second acoustic energy signals from said shifted bursts of electrical signals and for receiving at least components of said first acoustic energy signals responsive to said flow rate of said flowing fluid;

a transit time of said received acoustic energy signals having a second duration, said second duration being greater than said first duration of said bursts of electrical signals:

a first receiving amplifier associated with said first transducer and responsive to received components of said second acoustic energy signals and said bursts of electrical signals;

a second receiving amplifier associated with said second transducer and responsive to received components of said first acoustic energy signals and said bursts of electrical signals;

an exclusive-OR detector responsive to said received components of said first and second acoustic energy signals and to said bursts of said electrical signals applied to each of said transducers for determining:

a first phase difference between said bursts of said electrical signals applied to each of said transducers, said first phase difference being representative of a first transit time delay introduced by components of said apparatus within signal paths of said bursts of said electrical signals;

a second phase difference between said received components of said first and second acoustic energy signals received by each of said transducers, said second phase difference representing a second transit time delay introduced by both said components and by said flowing fluid;

wherein said exclusive-OR detector is adapted to generate output signals respectively representative of said first and said second phase differences; and a system responsive to said output signals from said exclusive-OR detector for generating a flow rate output signal representative of only said flow rate of said flowing fluid.

5. The apparatus of claim 4, wherein said system for generating a flow rate output signal comprises at least one sample-and-hold circuit.

6. The apparatus of claim 4, further comprising a low pass filter interposed between an output of said exclusive-OR detector and an input of at least one sample-and-hold circuit for filtering said phase difference signals.

7. The apparatus of claim 6, further comprising a switch for selectively coupling said low pass filter to said at least one sample-and-hold circuit.

8. A method for detecting a flow rate of a flowing fluid, said method comprising:

disposing a first transducer in acoustic contact with said flowing fluid;

disposing a second transducer in acoustic contact with said flowing fluid at a distance from first transducer;

generating bursts of electrical signals from a signal source;

applying said bursts of electrical signals to said first transducer to cause said first transducer to generate first acoustic energy signals;

applying said bursts of electrical signals to said second transducer to cause said second transducer to generate second acoustic energy signals:

using said first transducer to transmit said first acoustic energy signals and to receive said second acoustic energy signals which are responsive to said flow rate of said flowing fluid;

using said second transducer to transmit said second acoustic energy signals and to receive said first acoustic energy signals which are responsive to said flow rate of said flowing fluid;

detecting a first transit time delay of said bursts of electrical signals caused by signal paths through which said bursts of electrical signals propagate;

detecting a second transit time delay of said first and second acoustic energy signals, said second transit time delay comprising a time delay component caused by said flowing fluid and a time delay component caused by said signal path through which said bursts of said electrical signals propagate; and from said first and second transit time delays, extrapolating only said flow rate of said flowing fluid and generating a flow rate signal in accordance therewith.

* * * * *